(12) United States Patent  
Carnahan et al.

(10) Patent No.: US 12,466,480 B2
(45) Date of Patent: Nov. 11, 2025

(54) RADIAL DIFFERENTIAL SPEED CONTROL SYSTEM

(71) Applicant: DEERE & COMPANY, Moline, IL (US)

(72) Inventors: Bryce A. Carnahan, Chapel Hill, NC (US); Julian A. Bellalbero, Raleigh, NC (US); Kyle T. Martin, Holly Springs, NC (US)

(73) Assignee: Deere & Company, Moline, IL (US)

( * ) Notice: Subject to any disclaimer, the term of this patent is extended or adjusted under 35 U.S.C. 154(b) by 245 days.

(21) Appl. No.: 17/938,115

(22) Filed: Oct. 5, 2022

(65) Prior Publication Data

US 2024/0116569 A1 Apr. 11, 2024

(51) Int. Cl.
| | | |
|---|---|---|
| B62D 9/00 | (2006.01) | |
| A01D 34/00 | (2006.01) | |
| A01D 34/44 | (2006.01) | |
| A01D 69/02 | (2006.01) | |
| A01D 101/00 | (2006.01) | |
| B62D 6/00 | (2006.01) | |

(52) U.S. Cl.
CPC .......... B62D 9/002 (2013.01); A01D 34/006 (2013.01); A01D 34/44 (2013.01); A01D 69/02 (2013.01); B62D 6/002 (2013.01); B62D 6/007 (2013.01); A01D 2101/00 (2013.01)

(58) Field of Classification Search
CPC ........ B62D 9/002; B62D 6/002; B62D 6/007; B62D 11/003; B62D 11/04; A01D 34/006; A01D 34/44; A01D 69/02; A01D 2101/00; B60K 1/02; B60L 15/2036
See application file for complete search history.

(56) References Cited

U.S. PATENT DOCUMENTS

| | | |
|---|---|---|
| 5,406,778 A | 4/1995 | Lamb et al. |
| 6,082,084 A | 7/2000 | Reimers et al. |
| 7,610,738 B2 | 11/2009 | Daly et al. |
| 7,954,308 B2 | 6/2011 | Harris |
| 8,621,833 B2 | 1/2014 | Shida et al. |
| 9,179,596 B2 | 11/2015 | Phillips et al. |
| 9,635,809 B2 | 5/2017 | Iyasere et al. |
| 10,264,726 B2 | 4/2019 | Henson |
| 2007/0295545 A1* | 12/2007 | Romig .................. B60W 10/08 701/41 |
| 2012/0159916 A1 | 6/2012 | Ishii et al. |

(Continued)

FOREIGN PATENT DOCUMENTS

EP    1943894 A2    7/2008

OTHER PUBLICATIONS

Great Britain Combined Search and Examination Report issued in application No. GB2313207.9 dated Feb. 6, 2024, 08 pages.

*Primary Examiner* — Anne Marie Antonucci
*Assistant Examiner* — Luis G Del Valle

(57) ABSTRACT

A radial differential speed control system includes a steering angle sensor for a steerable rear wheel, a pedal sensor for sensing an operator input for a desired ground speed at a reference point adjacent an operator seat, and an electronic controller that uses the desired ground speed to calculate differential speeds of a left front drive wheel and a right front drive wheel to reduce the ground speed of a grass mowing machine when the steering angle sensor indicates the steerable rear wheel is turning.

10 Claims, 2 Drawing Sheets

(56) References Cited

U.S. PATENT DOCUMENTS

| | | | |
|---|---|---|---|
| 2014/0331630 A1* | 11/2014 | Phillips | B60T 8/1755 56/10.2 H |
| 2020/0172166 A1* | 6/2020 | Chang | B62D 5/0418 |
| 2020/0245560 A1* | 8/2020 | Legault | B60W 20/15 |
| 2021/0076561 A1* | 3/2021 | Kiyooka | G05D 1/0212 |
| 2021/0272390 A1* | 9/2021 | Reek | G07C 5/0841 |

* cited by examiner

RADIAL DIFFERENTIAL SPEED CONTROL SYSTEM

FIELD OF THE INVENTION

The present invention relates to grass mowing machines, and more specifically to a radial differential speed control system for grass mowing machines such as triplex greensmowers.

BACKGROUND OF THE INVENTION

Grass mowing machines used to mow golf courses, parks, and athletic fields where a high quality of cut is desired, may include three or more reel cutting units. For example, triplex greensmowers have two forward reel cutting units followed by a center or rear reel cutting unit positioned under the vehicle frame and the operator station. Reel cutting units have front and rear rollers, spiral cutting blades rotating in close proximity to a bedknife, and may have a removable grass catcher mounted in front of the cutting unit. For example, a reel cutting unit may have 8 spiral cutting blades.

Triplex greensmowers have a pair of front wheels and a steerable rear wheel. Electric traction drive systems on triplex greensmowers enable differential speed control for each of the front wheels. However, if electric traction drive systems have differential control but do not provide vehicle speed reduction when turning, the driver may experience high centrifugal forces, and possible turf damage may result.

There is a need for a radial differential speed control system that reduces ground speed of a triplex greensmower when turning, minimizes centrifugal forces, and reduces turf damage.

SUMMARY OF THE INVENTION

A radial differential speed control system includes a controller that provides differential speed commands to electric motors for a left front drive wheel and a right front drive wheel based on a sensor input for a turning angle of a steerable rear wheel. The controller provides commands that reduce speed at a reference point on a centerline of the grass mowing machine that is rearward of an axis of the left and right front drive wheels and toward the steerable rear wheel.

DESCRIPTION OF PREFERRED EMBODIMENT

Figure 1:
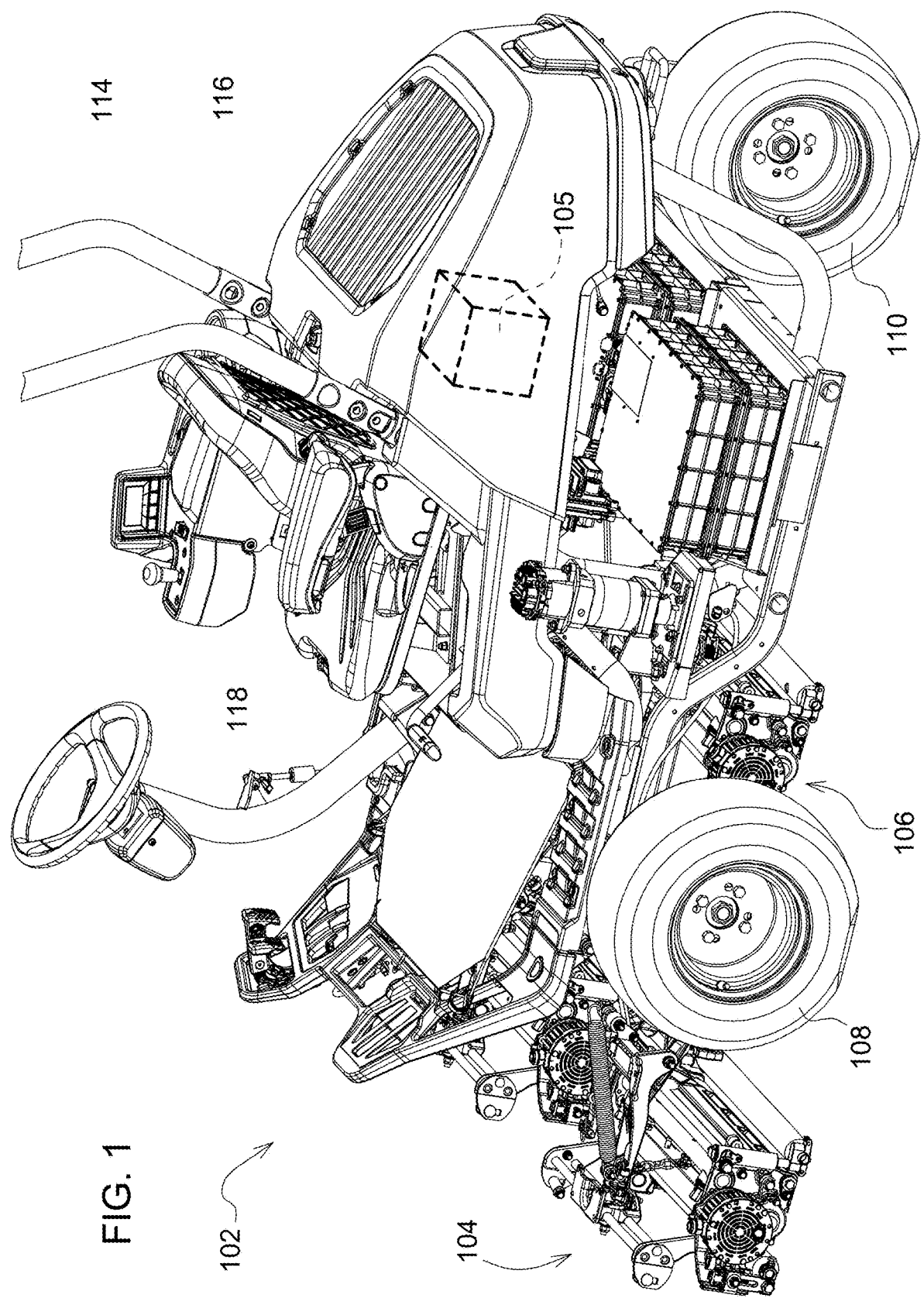
FIG. 1 is a perspective view of a triplex greensmower with a radial differential speed control system according to a first embodiment.
Figure 2:
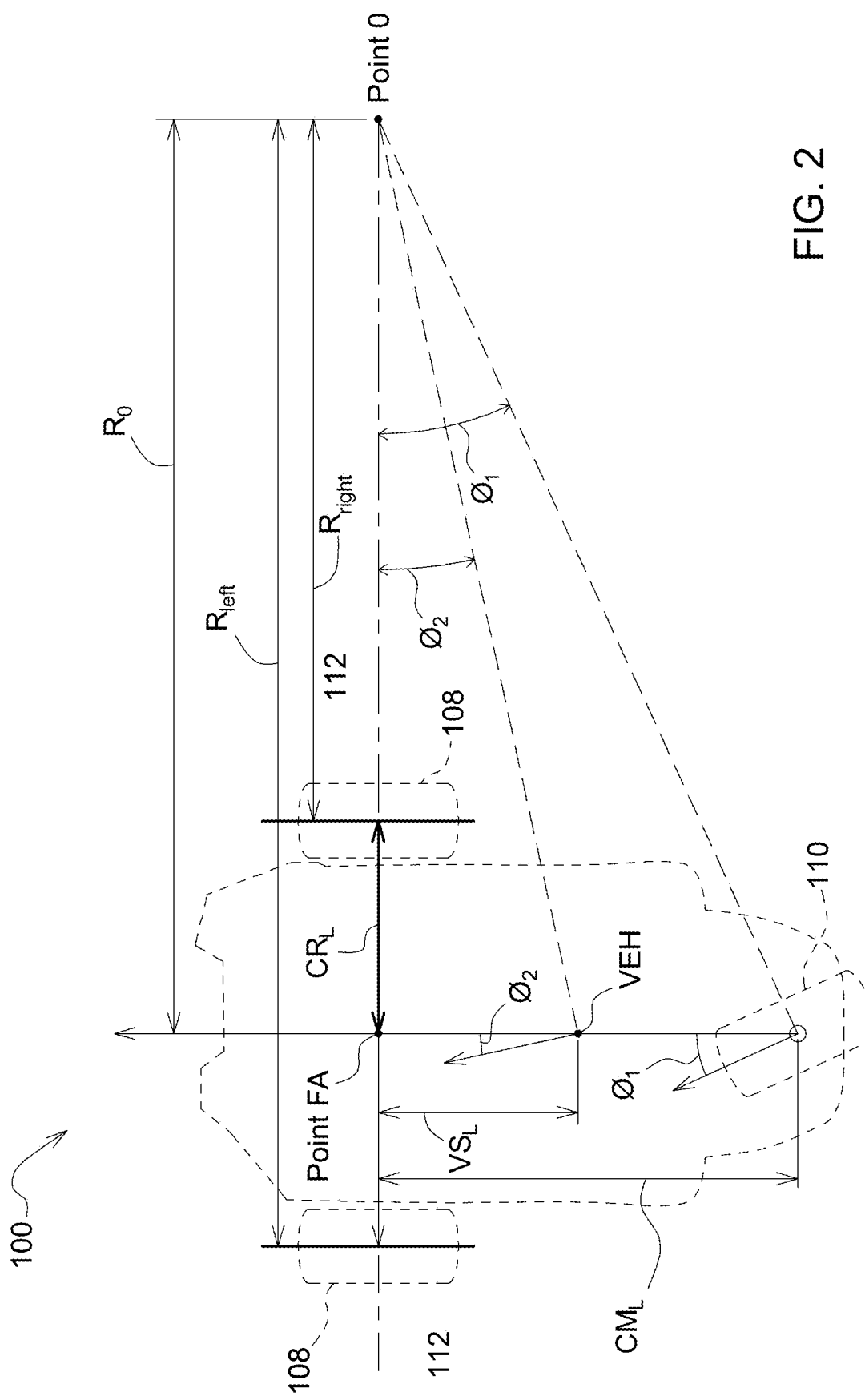
FIG. 2 is a schematic diagram of a radial differential speed control system for a triplex greensmower according to a first embodiment.

FIG. 1 shows triplex greensmower 102 having a radial differential speed control system that reduces ground speed when turning. The triplex greensmower may include left and right front reel cutting units 104 positioned side-by-side forwardly of left and right drive wheels 108, and center or rear reel cutting unit 106 positioned behind the drive wheels and in front of steerable rear wheel 110. An electric motor may drive each cutting reel and may be mounted to one side of the reel cutting unit. The left and right drive wheels may be driven by electric motors 112 (FIG. 2). Optionally, the steerable rear or center wheel also may be driven by an electric motor. While the radial differential speed control system is shown on a triplex greensmower, the system also may be used on other grass mowing machines having front drive wheels and steerable rear wheels. For example, the radial differential speed control system may be used on fairway mowers having 5 or 7 reel cutting units. There is no limitation of the number of reel cutting units.

In one embodiment, radial differential speed control system 100 may include a sensor input, e.g., from a steering angle sensor 114, to controller 105 for the angle $\phi 1$ of steerable rear wheel 110. The controller may use angle $\phi 1$ to determine the location of point 0, the instantaneous turn center of the triplex greensmower or other grass mowing machine. In FIG. 2, point 0 is shown as the instantaneous turn center extending from the steerable rear wheel and the front drive wheel axis.

In one embodiment, radial differential speed control system 100 may include a pedal input, e.g., from a pedal sensor 116, to the controller 105 for desired ground speed $V_{veh}$ at reference point VEH. Reference point VEH may be located anywhere on the centerline of a triplex greensmower or other grass mowing machine, rearward of front wheel axis FA. To minimize centrifugal force and improve operator feel, reference point VEH may be located near the operator seat 118. For example, the grass mowing machine may include a display or input device to the controller, which the operator may use to enter the desired location of VEH, or move the location forward or rearward.

In one embodiment, the radial differential speed control system may include a controller that calculates the ground speed $V_{FA}$ at the centerline of the front drive wheel axis, based on the desired ground speed $V_{veh}$ at reference point VEH, and angle $\phi_2$ from VEH to point 0. To calculate the ground speed $V_{FA}$ at the centerline of the front drive wheel axis, the controller may use the equation $V_{FA}=\cos(\phi_2)*V_{veh}$.

In one embodiment, the radial differential speed control system may include a controller that adjusts speed commands $\omega_L$ and $\omega_R$ to the electric motors for the left and right front drive wheels to reduce the ground speed of the grass mowing machine when turning. The speed commands may be a function of the turning angle $\phi_1$ of steerable rear wheel 110, the speed $V_{FA}$ at the front axle, and the location of reference point VEH relative to the front axle. To provide more aggressive speed reduction and improve operator feel during turns, the operator may move VEH d further rearward toward the steerable rear wheel, increasing the distance $VS_L$ from front drive wheel axis FA to reference point VEH.

In one embodiment, the radial differential speed control system may include a controller that may store and use fixed dimensions of the triplex greensmower or other grass mowing machine. For example, the calculations may include $CR_L$ which is one half of the front track width of the triplex greensmower (and the distance from point FA to either front drive wheel); and $CM_L$, the distance from the front drive wheel axis to the rear steerable wheel axis.

In one embodiment, the radial differential speed control system may include a controller that calculates the distance from each front drive wheel to point 0, the instantaneous turn center. The controller first may calculate $R_0$, the distance from the mower centerline to point 0, using the equation $R_0=CM_L/\tan(\phi_1)$. The controller then may calculate $R_{left}$, the distance from the left front wheel to point 0, using the equation $R_{left}=R_0+CR_L$; and $R_{right}$, the distance from the right front wheel to point 0, using the equation $R_{right}=R_0-CR_L$. Optionally, the controller may calculate $R_{rear}$, the distance from the center or rear steerable wheel to point 0, using the equation $R_{rear}=CM_L/\sin(\phi_1)$.

In one embodiment, the radial differential speed control system may include a controller that calculates and provides differential speed commands $\omega_L$ and $\omega_R$ to the left and right front wheel motors when turning. The controller may use the equation $\omega_L=(R_{left}/R_0)*V_{FA}$ for the speed command to the left front wheel motor, and the equation $\omega_R=(R_{right}/R_0)*V_{FA}$ for the speed command to the right wheel motor when turning. Optionally, the controller may use the equation $\omega_C=(R_{rear}/R_0)*V_{FA}$ for the speed command to the center or rear wheel motor when the grass mowing machine is turning. The differential speed commands may reduce speed of the grass mowing machine to improve operator feel and reduce turf damage when turning.

Having described the preferred embodiment, it will become apparent that various modifications can be made without departing from the scope of the invention as defined in the accompanying claims.

The invention claimed is:

1. A radial differential speed control system, comprising:
   a controller that provides differential speed commands to a left front drive wheel and a right front drive wheel of a grass mowing machine based on a sensor input for a turning angle of a steerable rear wheel of the grass mowing machine;
   the differential speed commands providing speed reduction commands to the left front drive wheel and right front drive wheel based upon a reference point on a centerline of the grass mowing machine that is rearward of an axis of the left and right front drive wheels and toward the steerable rear wheel.

2. The radial differential speed control system of claim 1 wherein the left front drive wheel and right front drive wheel are each driven by electric motors.

3. The radial differential speed control system of claim 1 wherein the reference point is adjacent an operator seat.

4. The radial differential speed control system of claim 1 wherein the speed reduction is adjustable by an operator input to the controller to move the reference point on the centerline.

5. A radial differential speed control system, comprising the steps of:

sensing a steering angle of a steerable rear wheel on a triplex greensmower;
   sensing a pedal input for a desired speed at a reference point on the triplex greensmower; and
   providing speed commands to a left front drive wheel motor and a right front drive wheel motor to reduce the speed of both the left front drive wheel motor and right front drive wheel motor of the triplex greensmower when turning, the speed commands being a function of the sensed steering angle, the sensed pedal input, the location of the reference point, and at least one dimension of the triplex greensmower, wherein the dimension includes a distance.

6. The radial differential speed control system of claim 5 wherein the reference point is adjacent an operator seat on the triplex greensmower and is adjustable by the operator.

7. The radial differential speed control system of claim 5 wherein at least one dimension of the triplex greensmower is stored in a controller memory, wherein the dimension includes the distance.

8. A radial differential speed control system, comprising:
   a steering angle sensor for a steerable rear wheel on a grass mowing machine;
   a pedal sensor for sensing an operator input for a desired ground speed at a reference point adjacent an operator seat on the grass mowing machine; and
   an electronic controller that uses the desired ground speed to calculate reduced differential speeds of both a left front drive wheel and a right front drive wheel when the steering angle sensor indicates the steerable rear wheel is at a turning angle;
   wherein said electronic controller reduces speed commands to said left and right front drive wheels based on said calculated reduced differential speeds.

9. The radial differential speed control system of claim 8 wherein the reference point is located on a centerline of the grass mowing machine.

10. The radial differential speed control system of claim 8 further including first and second electric motors for the left front drive wheel and the right front drive wheel.

* * * * *